United States Patent [19]
Bennett

[11] 3,869,453
[45] Mar. 4, 1975

[54] IRON CARBONYL COMPLEX OF AROMATIC AZO COMPOUNDS COMPLEXED WITH PARTICULAR PHOSPHINE ARSINE OR STIBINE COMPOUNDS

[75] Inventor: Robert Putnam Bennett, Bridgewater Township, N.J.

[73] Assignee: American Cyanamid Company, Stamford, Conn.

[22] Filed: Jan. 29, 1973

[21] Appl. No.: 327,270

Related U.S. Application Data

[63] Continuation-in-part of Ser. No. 154,667, June 18, 1971, abandoned, which is a continuation-in-part of Ser. No. 775,188, Nov. 12, 1968, abandoned.

[52] U.S. Cl.................. 260/242, 252/386, 44/57
[51] Int. Cl............................................ C07d 51/10
[58] Field of Search................................... 260/242

[56] References Cited
OTHER PUBLICATIONS
Bennett, Inorg. Chem., Vol. 9, p. 2184–2186 (1970).

*Primary Examiner*—Harry I. Moatz
*Attorney, Agent, or Firm*—Charles J. Fickey

[57] ABSTRACT

A complex is provided which is the reaction product of a diiron hexacarbonyl complex of benzo(c)cinnoline which has the formula:

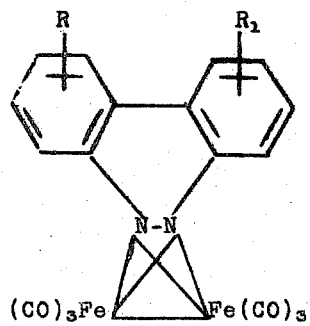

wherein R and $R_1$ are hydrogen, methyl or halogen, with a compound having the formula:

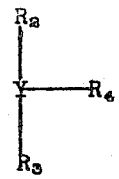

wherein Y is phosphorus, arsenic or antimony and $R_2$, $R_3$ and $R_4$ can be hydrogen, lower alkyl, or aryl of less than 3 aromatic rings, and at least one of $R_1$, $R_2$ or $R_3$ is not hydrogen.

6 Claims, No Drawings

IRON CARBONYL COMPLEX OF AROMATIC AZO COMPOUNDS COMPLEXED WITH PARTICULAR PHOSPHINE ARSINE OR STIBINE COMPOUNDS

CROSS REFERENCE TO RELATED APPLICATIONS

This application is a continuation-in-part of U.S. Patent Application Ser. No. 154,667, filed on June 18, 1971 now abandoned, which in turn is a continuation-in-part of U.S. Patent Application Ser. No. 775,188, filed on Nov. 12, 1968, now abaondoned.

This invention relates to iron complexes of azo compounds. More particularly, this invention relates to iron carbonyl complexes of azo compounds, their method of preparation and to substituted phosphine, arsine and stibine derivatives of the iron carbonyl complexes.

BACKGROUND OF THE INVENTION

Attempts have been made in the past to prepare iron carbonyl complexes of azo compounds, particularly by employing photolytically promoted reactions of an azo compound with an iron carbonyl compound. Thus, when azobenzene was reacted with an iron carbonyl, the product was found to be a complex of o-semidine rather than iron carbonyl complex of azobenzene.

THE INVENTION

The present invention is based on the discovery that iron carbonyl complexes of aromatic azo compounds can be successfully formed by heating an azo compound with an iron carbonyl compound at elevated temperatures above 100°C. The reaction can be carried out either in the absence or presence of a solvent. It is preferred to carry out the reaction in an inert solvent in which both the starting materials and the product are soluble, such as decalin. The reaction temperature employed is that which effects the desired reaction without degrading a significant portion of the product. Thus, it is preferred to employ reaction temperatures in the range of from 110°C. to 170°C. The elevated temperatures are maintained until evolution of carbon monoxide gas substantially ceases. The product is then recovered by removing the solvent, if it is employed, and thereafter purifying the residue in any conventional manner, as for example by recrystallization. It has been determined by means of spectroscopy that the complexes have the following formula:

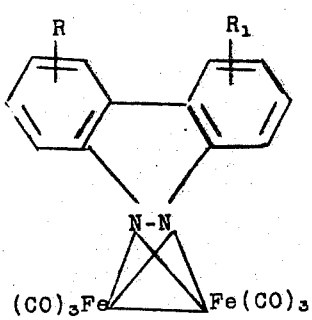

wherein R and $R_1$ are hydrogen, methyl or halogen.

The members of this new class of compounds are useful as initiators and promotors for the polymerization of certain monomers such as styrene and methyl methacrylate and, in addition, as anti-knock additives for gasoline. They are also useful as oxidation catalysts to promote the burning of fuel oils.

Any aliphatic or cyclic, cis or trans, azo compound can be reacted to prepare the complexes of this invention. The azo compound can be a mon-azo or poly-azo compound. Illustrative azo compounds which may be used include compounds such as benzo(c)cinnoline and derivatives thereof including mono- or poly-halo-benzo(c)cinnoline, and polymethyl-benzo(c)cinnoline.

The iron carbonyls useful in forming the complexes are iron pentacarbonyl ($Fe(CO)_5$), diiron nonacarbonyl ($Fe_2(CO)_9$) and triiron dodecacarbonyl ($Fe_3(CO)_{12}$).

The ratio of iron carbonyl reactant to azo reactant depends on (1) the iron carbonyl reactant employed and (2) the number of azo groups in the azo reactant to be complexed. For any given azo reactant the product is the same for all three iron carbonyl reactants. For each azo groups complexed, the product contains a —N—N— group. Therefore, when iron penta-

carbonyl is employed, 2 moles of the carbonyl compound are required for each azo group. When diiron nonacarbonyl is employed, 1 mole of the carbonyl compound is required for each azo group. When triiron dodecacarbonyl is employed, 2 moles of the carbonyl compound are required for 3 azo groups. Accordingly, the molar ratio of azo to carbonyl may be stated as being from about 1:1 to 3:2. These reactions can be illustrated as follows:

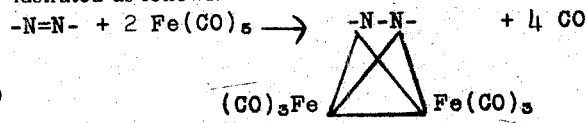

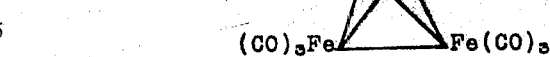

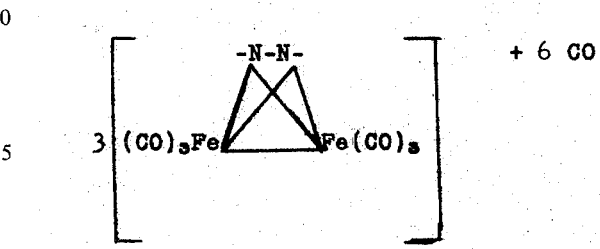

Generally, the use of about 10% excess of iron carbonyl reactant insures relatively complete reaction of the azo compound. When it is desired to partially complex the poly-azo compounds, at least sufficient iron carbonyl is employed to substantially completely complex one azo moiety of the azo compound. Subsequent to the reaction, the partially complexed azo compound can be separated from the totally complexed azo compound by column chromatography.

The novel iron carbonyl complexes can be further complexed with a phosphine, arsine or stibine compound to produce stable products. The reactants which can be employed are represented by the following structural formula:

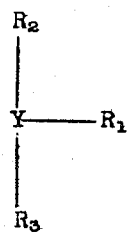

wherein Y is phsophorous, arsenic or antimony and $R_1$, $R_2$ and $R_3$ can be hydrogen, lower alkyl, or aryl of less than 3 aromatic rings, and at least one of $R_1$, $R_2$ or $R_3$ is not hydrogen.

The reaction may proceed at room temperature, but is best carried out at elevated temperatures in order to effect the replacement of one carbonyl group with the phosphine, arsine or stibine reactant. An inert solvent such as benzene or toluene is added to the reactants and the resultant mixture is heated to a temperature in the range of from 80°C. to 150°C. until evolution of carbon monoxide gas substantially ceases. The degree of substitution with the compound of formula I is controlled by varying the amount employed in the reaction. To obtain mono-substitution, at least one mole of the compound of formula I per mole of the iron carbonyl complex is employed. Generally, at least about 5% molar escess is employed to insure substantially complete monosubstitution.

Suitable compounds which can be reacted with the iron carbonyl complexes include triphenyl phosphine, diphenyl phosphine, phenyl dimethyl phosphine, triphenyl stibine, triphenyl arsine, diphenyl methyl stibine, phenyl dimethyl arsine and the like.

The following examples are provided for illustrative purposes and may include particular features of the invention. However, the examples should not be construed as limiting the invention, many variations of which are possible without departing from the spirit or scope thereof.

EXAMPLE I

Benzo(c)cinnoline (13.92 g., 0.077 mole) and iron pentacarbonyl (32 g., 0.163 mole) were mixed in decalin (125 ml.) and heated at 150°C. until gas evolution ceased. The reaction mixture was cooled and then filtered and the filtrate chromatographed on alumina. The solvent was removed with petroleum ether and the product eluted with petroleum ether/benzene (4/1) which, on evaporation, yielded 28.25 g. (79% yield) benzo(c)cinnoline diiron hexacarbonyl, red crystals, m.p. 153°-5° (dec.).

The complex which has the following structural formula:

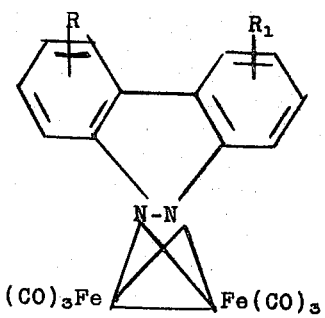

is non-conducting in nitromethane; mass spectrometry shows 6 carbonyl groups; ceric ammonium nitrate decomposes the complex to give a quantitative yield of benzocinnoline.

EXAMPLE II

Using the procedure of Example 1 and the appropriately corresponding starting materials, the following iron carbonyl complexes were prepared.

1,10-Dichlorobenzo(c)cinnoline diiron hexacarbonyl

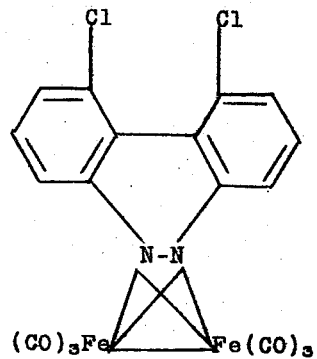

3,8-Dichlorobenzo(c)cinnoline diiron hexacarbonyl

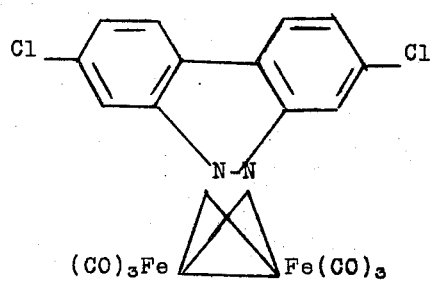

EXAMPLE III

Preparation of Benzo(c)cinnoline diiron pentacarbonyl triphenyl phosphine

Benzo(c)cinnoline diiron hexacarbonyl (1.0 g., 0.0022 mole) and triphenylphosphine (0.57 g., 0.0022 mole) in benzene (50 ml.) were heated for about one-half hour with stirring until gas evolution ceased. The reaction mixture was cooled and evaporated to dryness. The remaining solid was triturated with petroleum ether followed by warm ethanol to remove unreacted starting materials. The resulting solid was then dried, wt. 1.5 g. (100% yield), m.p. 205° (dec.).

EXAMPLE IV

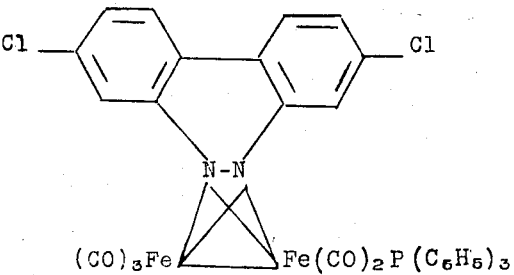

Using the procedure of Example 3, 3,8-dichlorobenzo-(c)cinnoline diiron pentacarbonyl triphenylphosphine was prepared.

EXAMPLE V

Preparation of Benzo(c)Cinnoline Diiron Pentacarbonyl Triphenyl Arsine

Benzo(c)cinnoline diiron hexacarbonyl (1.0g., 0.0022 mole) and triphenylarsine (0.67g., 0.0022 mole) in benzene (50 ml.) are heated for about one-half hour with stirring until gas evaluation ceases. The reaction mixture is cooled and evaporated to dryness. The residue is triturated with petroleum ether followed by warm ethanol to remove unreacted starting materials.

EXAMPLE VI

Preparation of Benzo(c)Cinnoline Diiron Pentacarbonyl Triphenyl Stibine

Benzo(c)cinnoline diiron hexacarbonyl (1.0g., 0.0022 mole) and triphenylstibine(0.77 g., 0.0022 mole) in benzene (50 ml.) are heated for about one-half hour with stirring until gas evaluation ceases. The reaction mixture is cooled and evaporated to dryness. The residue is triturated with petroleum ether followed by warm ethanol to remove unreacted starting materials.

EXAMPLE VII

Metal Carbonyl Phosphine Complex as Combustion Improver

Two porcelain capsule dishes are heated at 1,300 F. for 10 minutes cooled to room temperature and weighed to the nearest mg. A 0.5 gm. sample of lampblack is weighed into each dish and the weight recorded to the nearest mg. To each dish is then added 2 ml. of untreated No. 2 fuel oil. In addition, 0.02 gms. of benzo(c)cinnoline diiron pentacarbonyl triphenylphosphine is added to one dish, the remaining dish constituting a control.

The fuel oil is then flared off by warming each of the dishes over a bunsen burner until the oil ignites. The dishes are positioned in a casserole which is placed in a muffle furnace at 900 F. for 30 minutes. The dishes are removed from the furnace cooled to room temperature and weighed to the nearest mg.

The present burn-off is calculated as follows:

Percent Burn-off (1 $w/W$) 100 wherein $w$ is the final weight of the capsule and its contents, and W is the initial weight of the capsule and its contents.

The treated sample demonstrated a 62 percent burn-off, while the burn-off of the control did not exceed 5 percent.

I claim:

1. A diiron pentacarbonyl complex of a benzo(c)cinnoline having the formula:

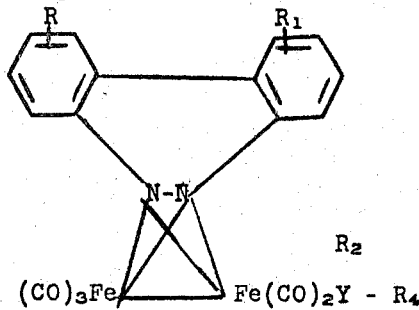

wherein R and R are hydrogen, methyl or halogen, Y is phosphorus, arsenic or antimony and R , R and R can be hydrogen or lower alkyl and at least one of R , R or R is not hydrogen.

2. A product of claim 1 wherein Y is phosphorous.
3. A product of claim 1 wherein Y is arsenic.
4. A product of claim 1 wherein Y is antimony.
5. A product of claim 1 wherein R and R are hydrogen.
6. A product of claim 1 wherein R and R are chlorine.

* * * * *

UNITED STATES PATENT OFFICE
CERTIFICATE OF CORRECTION

Patent No. 3,869,453      Dated 4th March, 1975

Inventor(s) ROBERT PUTNAM BENNETT

It is certified that error appears in the above-identified patent and that said Letters Patent are hereby corrected as shown below:

Column 6, line 4, after 900 add -- ° -- before F

Column 6, line 31, R and R should read -- R and $R_1$ --

Line 32, R , R and R should read -- $R_2$, $R_3$ and $R_4$ -- lines 33-34 should read -- $R_2$, $R_3$ or $R_4$ -- line 38, claim 5 should read -- A product of claim 1 wherein R and $R_1$ are hydrogen --.

line 40, claim 6 should read -- A product of claim 1 wherein R and $R_1$ are chlorine --.

Signed and sealed this 20th day of May 1975.

(SEAL)
Attest:

RUTH C. MASON
Attesting Officer

C. MARSHALL DANN
Commissioner of Patents
and Trademarks